United States Patent [19]
Takahashi et al.

[11] Patent Number: 6,102,826
[45] Date of Patent: Aug. 15, 2000

[54] CONTROL APPARATUS FOR VEHICULAR AUTOMATIC TRANSMISSION

[75] Inventors: Tooru Takahashi; Kenji Nakajima, both of Tochigi-ken, Japan

[73] Assignee: Honda Giken Kogyo Kabushiki Kaishi, Tokyo, Japan

[21] Appl. No.: 09/373,237

[22] Filed: Aug. 12, 1999

[30] Foreign Application Priority Data

Sep. 30, 1998 [JP] Japan .................................. 10-277139

[51] Int. Cl.$^7$ ............................. F16H 61/12; F16H 63/02
[52] U.S. Cl. ............................................ 475/119; 477/906
[58] Field of Search ................................... 475/119, 133; 477/906, 907

[56] References Cited

U.S. PATENT DOCUMENTS 5,509,868  4/1996  Eaton ....................................... 477/906

*Primary Examiner*—Dirk Wright
*Attorney, Agent, or Firm*—Armstrong, Westerman, Hattori, McLeland & Naughton

[57] ABSTRACT

A plurality of shift control valves for independently controlling the supply of hydraulic oil to, and the discharge thereof from, a plurality of hydraulic engaging elements are divided into a first group of shift control valves which establish a predetermined-speed transmission train and a second group of shift control valves corresponding to the other hydraulic engaging elements. A fail-safe valve is interposed between an oil supply passage which is connected to a hydraulic pressure source and the second group of speed change control valves. The fail-safe valve is switched to a closed position in a condition in which the hydraulic oil is supplied to all of such plurality of hydraulic engaging elements as are not to be engaged at the same time, whereby the oil supply passage is connected only to the first group of shift control valves. Each of the first group of shift control valves is provided with an oil chamber for urging it toward an oil supply position. Each of the oil chambers is connected to the oil supply passage via the fail-safe valve in the closed position thereof. At the time of failure, the line pressure from the oil supply passage is inputted into oil chambers to thereby forcibly switch the first group of shift control valves to the oil supply position. The hydraulic oil is thus supplied to the corresponding hydraulic engaging elements.

1 Claim, 2 Drawing Sheets

| HYDRAULIC ENGAGING ELEMENT | | | | | SOLENOID VALVE | | | | |
|---|---|---|---|---|---|---|---|---|---|
| C1 | C2 | C3 | B1 | B2 | $7_1$ | $7_2$ | $7_3$ | $7_4$ | $7_5$ |
| 1ST SPEED ○ | × | × | × | ○ | ON | ON | ON | OFF | ON |
| 2ND SPEED ○ | × | × | ○ | × | ON | ON | ON | ON | OFF |
| 3RD SPEED ○ | × | ○ | × | × | ON | ON | OFF | OFF | OFF |
| 4TH SPEED ○ | ○ | × | × | × | ON | OFF | ON | OFF | OFF |
| 5TH SPEED × | ○ | ○ | × | × | OFF | OFF | OFF | OFF | OFF |
| 6TH SPEED × | ○ | × | ○ | × | OFF | OFF | ON | ON | OFF |

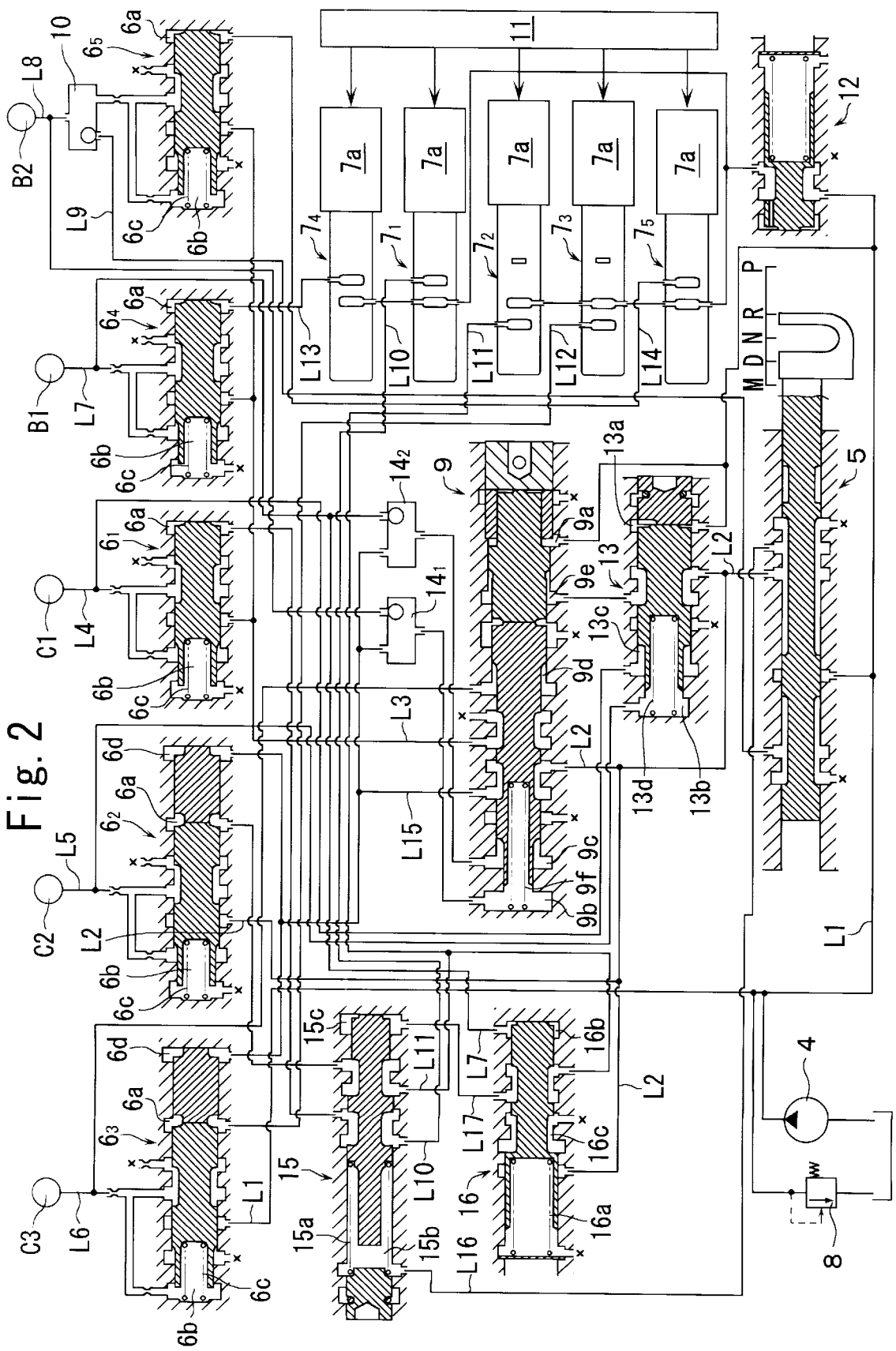

CONTROL APPARATUS FOR VEHICULAR AUTOMATIC TRANSMISSION

BACKGROUND OF THE INVENTION

1. Field of the Invention

The present invention relates to a control apparatus for a vehicular automatic transmission which is provided with a plurality of hydraulic engaging elements and which performs shifting (or speed changing) of a plurality of transmission trains (or speed stages) by supplying hydraulic oil to, and discharging it from, these hydraulic engaging elements. In this specification, the term "vehicular automatic transmission" means an automatic transmission for a vehicle such as a motor vehicle.

2. Description of Related Art

Conventionally, as a control apparatus for this kind of automatic transmission, there is known one in which a plurality of shift control valves corresponding to a plurality of hydraulic engaging elements are provided so that supply of hydraulic oil to, and discharge thereof from, each of the hydraulic engaging elements can be independently controlled by each of the shift control valves. This control apparatus, however, has the following disadvantage. Namely, when the shift control valves fail (or are poorly or wrongly operated), hydraulic engaging elements other than those for establishing a desired transmission train are also engaged, with the result that there occurs a so-called simultaneous engagement in which a plurality of transmission trains are established at the same time.

In order to solve this kind of problem, there is known an apparatus in Japanese Published Unexamined Patent Application No. 42681/1996. In this apparatus, a plurality of shift control valves are divided or grouped into two groups, i.e., a first group of shift control valves corresponding to those hydraulic engaging elements ice for establishing a predetermined transmission train, and a second group of shift control valves corresponding to the other hydraulic engaging elements. Between an oil supply passage which is connected to a hydraulic pressure source and the second group of shift control valves, there is interposed a fail-safe valve which can be switched between an open position in which the oil supply passage is connected to the second group of shift control valves and a closed position in which this connection is shut off. At the time of failure in which the hydraulic oil is supplied to all of such plurality of hydraulic engaging elements as are not to be engaged at the same time, the above-described fail-safe valve is switched to the closed position. In this manner, the oil supply passage is connected only to the above-described first group of shift control valves to thereby prevent the occurrence of simultaneous engagement.

In the above-described conventional apparatus, the object of connecting the oil supply passage to the first group of shift control valves at the time of failure is to supply hydraulic oil to the hydraulic engaging elements corresponding to the first group of shift control valves to enable the vehicle to run by establishing a predetermined-speed transmission train. There is, however, a possibility that the hydraulic oil can no longer be supplied to the corresponding hydraulic engaging elements due to the failure in the first group of shift control valves. It is therefore desirable to further improve the redundancy of the fail-safe function.

In view of the above-described points, the present invention has an object of providing a control apparatus in which, even if control malfunction occurs to the first group of shift control valves at the time of failure, the hydraulic oil can be supplied to the corresponding hydraulic engaging elements so that a predetermined-speed transmission train can be surely established.

SUMMARY OF THE INVENTION

In order to attain the above and other objects, the present invention is a control apparatus for a vehicular automatic transmission having a plurality of hydraulic engaging elements for establishing a plurality of transmission trains by supply of hydraulic oil to, and discharge thereof from, the plurality of hydraulic engaging elements. The control apparatus comprises: a plurality of shift control valves corresponding to the plurality of hydraulic engaging elements for independently controlling the supply of hydraulic oil to, and the discharge thereof from, each of the hydraulic engaging elements; the plurality of shift control valves being divided into a first group of shift control valves corresponding to the hydraulic engaging elements for establishing a predetermined-speed transmission train and a second group of shift control valves corresponding to the other hydraulic engaging elements; a fail-safe valve interposed between an oil supply passage which is connected to a hydraulic pressure source and the second group of shift control valves so as to be switchable between an open position in which the oil supply passage is connected to the second group of shift control valves and a closed position in which this connection is shut off; the fail-safe valve being switched to the closed position in a condition in which the hydraulic oil is supplied to all of such plurality of hydraulic engaging elements as are not to be engaged at a same time, whereby the oil supply passage is connected only to the first group of shift control valves; wherein each of the first group of shift control valves is provided with an oil chamber for urging each of the shift control valves toward an oil supply position in which the hydraulic oil is supplied to corresponding hydraulic engaging elements; and wherein each of the oil chambers is connected to the oil supply passage via said fail-safe valve in the closed position of the fail-safe valve, whereby the first group of shift control valves are switched to, and maintained in, the oil supply position.

According to the present invention, at the time of failure in which the hydraulic oil is supplied to the plurality of hydraulic engaging elements which should not be simultaneously engaged, the first group of shift control valves can be forcibly switched to, and maintained in, the oil supply position as a result of the switching of the fail-safe valve to the closed position. In this manner, even if control malfunction occurs to the first group of shift control valves, the hydraulic oil can be supplied to the corresponding hydraulic engaging elements, whereby the predetermined-speed of transmission train can be surely established.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 2 is a hydraulic control circuit of one example of the present invention.

DETAILED DESCRIPTION OF PREFERRED EMBODIMENTS

Figures 1, 3:
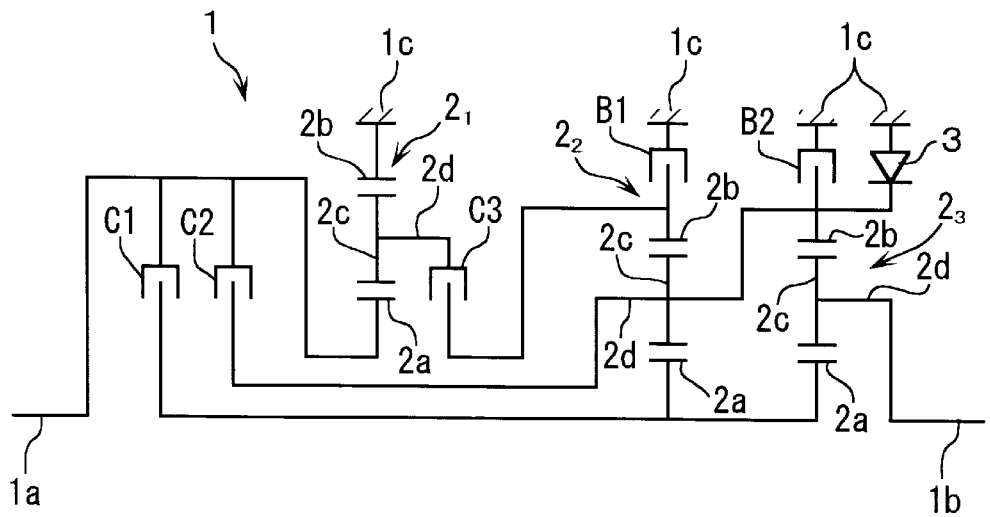
FIG. 1 is a skeleton diagram of one example of a transmission to which the present invention is applied.
FIG. 3 is a table showing the state of engagement of the hydraulic engaging elements in each speed of transmission stages as well as the state of energizing of the solenoid valves.

With reference to FIG. 1, numeral 1 denotes an automatic transmission for a vehicle such as a motor vehicle. This transmission 1 is constituted by, or made up of, a planetary gear type of transmission having: an input shaft 1a which is connected to an engine (not illustrated) via a fluid torque converter; an output shaft 1b which is connected to driving wheels of the vehicle via a differential gear (not illustrated); and a total of three, i.e., first through third, planetary gears $2_1$, $2_2$, $2_3$ which are disposed between the input shaft 1a and the output shaft 1b. This transmission 1 establishes six forward transmission trains (or speeds) and one reverse transmission train.

Each of the planetary gears $2_1$, $2_2$, $2_3$ is made up of: a sun gear 2a; a ring gear 2b; a pinion 2c which engages with both the gears 2a, 2b; and a carrier 2d which rotatably supports the pinion 2c. The sun gear 2a of the first planetary gear $2_1$ is connected to the input shaft 1a, and the carrier 2d of the third planetary gear $2_3$ is connected to the output shaft 1b. Further, the ring gear 2b of the first planetary gear $2_1$ is connected to the casing 1c of the transmission 1 to thereby prevent the ring gear 2b from rotating relative to the casing 1c. The sun gears 2a, 2a of the second and the third planetary gears $2_2$, $2_3$ are connected to each other. Further, the carrier 2d of the second planetary gear $2_2$ and the ring gear 2b of the third planetary gear $2_3$ are connected to each other. This ring gear 2b is connected to the casing 1c via a one-way clutch 3 which serves as a reaction force receiver.

The transmission 1 is provided with the following members as hydraulic engaging elements: i.e., a first clutch C1 which connects the input shaft 1a to the sun gears 2a, 2a of the second and the third planetary gears $2_2$, $2_3$; a second clutch C2 which connects the input shaft 1a to the carrier 2d of the second planetary gear $2_2$; a third clutch C3 which connects the carrier 2d of the first planetary gear $2_1$ to the ring gear 2b of the second planetary gear $2_2$; a first brake B1 which connects the ring gear 2b of the second planetary gear $2_2$ to the casing 1c; and a second brake B2 which connects the ring gear 2b of the third planetary gear $2_3$ to the casing 1c.

According to the above-described constitution or arrangement, the following is possible: namely, a first-speed transmission train is established when both the first clutch C1 and the second brake B2 are engaged; a second-speed transmission train is established when both the first clutch C1 and the first brake B1 are engaged; a third-speed transmission train is established when both the first clutch C1 and the third clutch C3 are engaged; a fourth-speed transmission train is established when both the first clutch C1 and the second clutch C2 are engaged; a fifth-speed transmission train is established when both the second clutch C2 and the third clutch C3 are engaged; a sixth-speed transmission train is established when both the second clutch C2 and the first brake B1 are engaged; and a reverse transmission train is established when both the third clutch C3 and the second brake B2 are engaged.

The operation of these clutches C1, C2, C3 and the brakes B1, B2 is controlled by a hydraulic control circuit as shown in FIG. 2. This hydraulic control circuit is provided with the following members, namely: a hydraulic pressure source 4; a manual valve 5; first through fifth, i.e., a total of five, shift control valves $6_1$ through $6_5$ which independently control the supply of hydraulic oil to, and discharge thereof from, each of the clutches C1, C2, C3 and each of the brakes B1, B2; and first through fifth, i.e., a total of five, solenoid valves $7_1$ through $7_5$ which independently control each of the shift control valves $6_1$ through $6_5$.

The manual valve 5 is arranged to be switched, in a manner interlocked with the operation of a selector lever (not illustrated), to P position which is for parking range, R position which is for reverse running range, N position (illustrated position) which is for neutral range, D position which is for automatic shift range for forward running, and M position which is for manual shift range for forward running. In the D position and the M position, an oil passage L1 which is communicated with the hydraulic pressure source 4 is connected to an oil passage L2. Pressurized hydraulic oil whose pressure is adjusted to a predetermined line pressure by a regulator 8 is thus supplied to the oil passage L2. The hydraulic oil is thus constantly supplied to the second shift control valve $6_2$ for the second clutch C2 via the oil passage L2. The hydraulic oil is also supplied to the first shift control valve $6_1$ for the first clutch C1, to the fourth shift control valve $6_4$ for the first brake B1, and to the fifth shift control valve $6_5$ for the second brake B2 via a third oil passage L3 which is connected to the second oil passage L2 via a fail-safe valve 9 which is described in detail hereinafter. The hydraulic oil is constantly supplied to the third shift control valve $6_3$ for the third clutch C3 via the oil passage L1 irrespective of the manual valve 5.

The oil passages L4, L5, L6, L7 which are respectively communicated with the first through the third clutches C1, C2, C3 and the first brake B1 are directly connected to the first through the fourth shift control valves $6_1$, $6_2$, $6_3$, $6_4$. The oil passage L8 which is communicated with the second brake B2, on the other hand, is arranged to be selectively connected, via a shuttle valve 10, to the fifth shift control valve $6_5$ and an oil passage L9 which is communicated with the manual valve 5. The oil passage L9 is connected to the oil passage L1 in the R position of manual valve 5. The second brake B2 is thus constantly engaged in the R position thereof. As a result of engagement of the third clutch C3 by the hydraulic oil supply from the third shift control valve $6_3$, the reverse transmission train is established.

Each of the shift control valves 6. through 6. is provided with: an oil chamber 6a which urges each of the shift control valves $6_1$ through $6_5$ toward a position on the left side in which the hydraulic oil can be supplied (also called an oil supply position); an oil chamber 6b which urges each of the shift control valves $6_1$ through $6_5$ toward a position on the right side in which the hydraulic oil can be discharged (also called the oil discharge position, illustrated position); and a spring 6c which is contained inside the oil chamber 6a of each of the shift control valves $6_1$ through $6_5$. A signal pressure from each of solenoid valves $7_1$ through $7_5$ is inputted into the oil chamber 6a of each of the shift control valves $6_1$ through $6_5$ via each of oil passages L10 through L14 which are respectively communicated with each of the solenoid valves $7_1$ through $7_5$. The hydraulic pressure on the downstream side of each of the shift control valves $6_1$ through $6_5$ is inputted into the oil chamber 6b of each of the shift control valves $6_1$ through $6_5$. It is thus so arranged that the hydraulic pressure on the downstream side of each of the shift control valves $6_1$ through $6_5$, i.e., the hydraulic pressure of each of the hydraulic engaging elements C1, C2, C3, B1, B2 can be modulated according to the signal pressure from each of the solenoid valves $7_1$ through $7_5$.

Each of the solenoid valves $7_1$ through $7_5$ is constituted by a solenoid proportional valve which outputs a signal pressure corresponding to the amount of electric current charged to a solenoid 7a of each of the solenoid valves $7_1$ through $7_5$. The electric charging to the solenoid 7a of each of the solenoid valves $7_1$ through $7_5$ is controlled by an electronic control circuit 11 which is made up of an onboard computer. Each of the solenoid valves $7_1$ through $7_5$ receives, as an input, a modulator pressure (a certain pressure which is lower than the line pressure) from a modulator valve 12 which is connected to the oil passage L1. The signal pressure which is outputted at a fully opened condition amounts to the modulator pressure.

In the D position and the M position of the manual valve 5, it becomes possible to supply the hydraulic oil to all of the shift control valves $6_1$ through $6_5$. When the signal pressures from the first and the fifth solenoid valves $7_1$, $7_5$ are increased, the hydraulic oil is supplied to the first clutch C1 and to the second clutch C2 via the first and the fifth shift control valves $6_1$, $6_5$, whereby the first-speed transmission train is established. When the signal pressures from the first and the fourth solenoid valves $7_1$, $7_4$ are increased, the hydraulic oil is supplied to the first clutch C1 and the first brake B1 via the first and the fourth shift control valves $6_1$, $6_4$, whereby the second-speed transmission train is established. When the signal pressures from the first and the third solenoid valves $7_1$, $7_3$ are increased, the hydraulic oil is supplied to the first clutch C1 and the third clutch C3 via the first and the third shift control valves $6_1$, $6_3$, whereby the third-speed transmission train is established. When the signal pressures from the first and the second solenoid valves $7_1$, $7_2$ are increased, the hydraulic oil is supplied to the first clutch C1 and the second clutch C2 via the first and the second shift control valves $6_1$, $6_2$, whereby the fourth-speed transmission train is established. When the signal pressures from the second and the third solenoid valves $7_2$, $7_3$ are increased, the hydraulic oil is supplied to the second clutch C2 and the third clutch C3 via the second and the third shift control valves $6_2$, $6_3$, whereby the fifth-speed transmission train is established. When the signal pressures from the second and the fourth solenoid valves $7_2$, $7_4$ are increased, the hydraulic oil is supplied to the second clutch C2 and the first brake B1 via the second and the fourth shift control valves $6_2$, $6_4$, whereby the sixth-speed transmission train is established.

In the D position of the manual valve 5, each of the solenoid valves $7_1$ through $7_5$ is controlled by the electronic control circuit 11 depending on the running conditions of the vehicle to thereby perform the first-speed through the sixth-speed automatic speed shifting. In the M position, each of the solenoid valves $7_1$ through $7_5$ is controlled by the operation of an upshift switch and a downshift switch (both not illustrated) via the electronic control circuit 11. Whenever the upshift switch or the downshift switch is switched on, the upshifting or the downshifting is performed. During the speed shifting, the boosting of the hydraulic pressure of an on-coming hydraulic engaging element (i.e., an element to be engaged) at the time of speed shifting and the pressure decreasing of the hydraulic pressure of an off-going hydraulic engaging element (i.e., an element to be disengaged) at the time of speed shifting are appropriately controlled by the corresponding solenoid valve so as not to give rise to speed shift shocks.

The first, the fourth and the fifth solenoid valves $7_1$, $7_4$, $7_5$ are constituted into a normally-closed type and the second and the third solenoid valves $7_2$, $7_3$ are constituted into a normally-open type. The state of energizing of the solenoids $7a$ of the solenoid valves $7_1$ through $7_5$ and the state of engaging of the hydraulic engaging elements C1 through C3, B1, B2 in the D position and the M position, respectively, at the time of establishing each of the transmission trains are shown in FIG. 3. In the figure, the mark "O" shows that the hydraulic engaging element in question is engaged, and the mark "X" shows that the hydraulic engaging element is disengaged or released.

If more than three hydraulic engaging elements are engaged at the same time, or if the third clutch C3 and the first bake B1 are engaged even when two hydraulic engaging elements are engaged at the same time, simultaneous engagement occurs, whereby the transmission 1 becomes locked. Further, when the third clutch C3 and the second brake B2 are engaged while the vehicle is running in the forward direction, the reverse running transmission is established, whereby the transmission 1 and the engine are subject to undue conditions.

As a solution to this kind of problems, in the present embodiment, the following solution is employed. Namely, the first through the fifth shift control valves $6_1$ through $6_5$ are grouped or divided into two groups. A first group is made up of the shift control valves for establishing a predetermined-speed transmission train, e.g., the second and the third shift control valves $6_2$, $6_3$ corresponding to the second and the third clutches C2, C3 which establish the fifth-speed transmission train, and a second group is made up of the first, the fourth and the fifth shift control valves $6_1$, $6_4$, $6_5$ corresponding to the other hydraulic engaging elements C1, B1, B2. A fail-safe valve 9 is interposed between the oil passage L3 which is communicated with the second group of shift control valves $6_1$, $6_4$, $6_5$ and the oil passage L2 which is the oil supply passage. At the time of failure in which the hydraulic oil is supplied to such a plurality of hydraulic engaging elements as are not to be engaged at the same time, the oil supply to the second group of shift control valves $6_1$, $6_4$, $6_5$ is stopped, whereby the above-described disadvantages can be prevented.

The fail-safe valve 9 is switchable between an open position on the left side in which the oil passages L2 and the oil passage L3 are connected to each other, and a closed position (illustrated position) on the right side in which this connection is shut off. The line pressure from the oil passage L1 is inputted into an oil chamber $9a$ on the right end of the fail-safe valve 9 to thereby urge the fail-safe valve 9 to the open position. In addition, the fail-safe valve 9 is provided with four oil chambers $9b$, $9c$, $9d$, $9e$ which serve to urge the fail-safe valve 9 to the closed position. The oil chamber $9b$ receives as an input the oil pressure of the second brake B2 via the oil passage L8, the oil chamber $9c$ receives as an input the oil pressure of the first brake B1 via the oil passage L7, and the oil chamber $9d$ receives as an input the oil pressure of the third clutch C3 via the oil passage L6, respectively. The oil chamber $9e$ receives as an input the line pressure from the oil passage L2 via a combined signal valve 13 which is described in detail hereinafter. The fail-safe valve 9 is further urged toward the closed position by a spring $9f$. When the hydraulic pressures to be inputted into any two oil chambers among the oil chambers $9b$, $9c$, $9d$, $9e$ have exceeded a predetermined pressure, a combined force of the urging force by these hydraulic pressures and the urging force by the spring $9f$ exceeds the urging force due to the line pressure to be inputted into the oil chamber $9a$. The fail-safe valve 9 is thus switched to the closed position. The above-described combined signal valve 13 is switchable between an open position (illustrated position) on the right side in which the oil passage L2 is connected to the oil chamber $9e$ and a closed position on the left side in which this connection is shut off. An oil chamber $13a$ on the right end of the combined signal valve 13 receives as an input the line pressure from the oil passage L1 to thereby urge the combined signal valve 13 toward the open position. The combined signal valve 13 is further provided with two oil chambers 13b, 13c which urge the combined signal valve 13 toward the closed position. The oil chamber 13b receives as an input the oil pressure of the second clutch C2 via the oil passage L5, and the oil chamber 13c receives as an input the oil pressure of the first clutch C1 via the oil passage L4, respectively. The combined signal valve 13 is also urged toward the closed position by a spring 13d. When a state is attained in which both the first clutch C1 and the second clutch C2 are engaged at the same time (i.e., the state of the fourth-speed transmission train), the combined force of the urging force by the hydraulic pressures to be inputted into the oil chambers 13b, 13c and the urging force by the spring 13d exceeds the urging force by the line pressure to be inputted into the oil chamber 13a. The combined signal valve 13 can thus be switched to the open position.

When both the first clutch C1 and the second clutch C2 are engaged, if the line pressure is inputted into the oil chamber 9e of the fail-safe valve 9 and, in this state, if the hydraulic oil is supplied to any one of the other hydraulic engaging elements C3, B1, B2, the fail-safe valve 9 is switched to the closed position. Further, even in a state in which only one of the first clutch C1 and the second clutch C2 is engaged or the clutches C1, C2 are both disengaged whereby the line pressure is not inputted into the oil chamber 9e, if the hydraulic oil is supplied to more than two among the other hydraulic engaging elements C3, B1, B2, the fail-safe valve 9 is switched to the closed position. As a result of this switching of the fail-safe valve 9 to the closed position, the connection between the oil passage L2 and the oil passage L3 is shut off. Consequently, at the time of failure, the supply of hydraulic oil to the second group of shift control valves $6_1$, $6_4$, $6_5$ is anyway stopped, whereby the corresponding hydraulic engaging elements C1, B1, B2 are released or disengaged.

There is further provided an oil passage L15 which is connected to the oil passage L2 via the fail-safe valve 9 in the closed position of the fail-safe valve 9. The oil passage L8 which is communicated with the second brake B2 and the oil passage L15 are connected to the oil chamber 9b of the fail-safe valve 9 via a shuttle valve $14_1$. The oil passage L7 which is communicated with the first brake B1 and the oil passage L15 are connected to the oil chamber 9c of the fail-safe valve 9 via a shuttle valve $14_2$. In this arrangement, once the fail-safe valve 9 is switched to the closed position at the time of failure, the line pressure from the oil passage L2 is inputted into the oil chambers 9b, 9c via the oil passage L15. Therefore, even if the oil pressure in the corresponding hydraulic engaging elements C1, B1, B2 is lowered as a result of stopping of oil supply to the second group of shift control valves $6_1$, $6_4$, $6_5$, the fail-safe valve 9 is held in the closed position, whereby the chattering of the fail-safe valve 9 can be prevented.

Even if the fail-safe valve 9 is switched to the closed position at the time of failure, the oil passage L2 and the oil passage L1, which serve as oil supply passages, are connected to the second shift control valve $6_2$ and the third shift control valve $6_3$, respectively, of the first group. Therefore, the fifth-speed transmission train can be established by engaging the second clutch C2 and the third clutch C3. However, if the second shift control valve $6_2$ or the third shift control valve $6_3$ can no longer be switched to the oil supply position due to the poor control of the second solenoid valve $7_2$ or the third solenoid valve $7_3$, i.e., if a high-pressure signal pressure can no longer be outputted from these solenoid valves $7_2$, $7_3$ due to a trouble in which the normally-open second and third solenoid valves $7_2$, $7_3$ are kept switched on (i.e., a trouble in which the solenoids are kept energized), the hydraulic oil can no longer be supplied to the second and the third clutches C2, C3, whereby the fifth-speed transmission train cannot be established.

As a solution, in the present embodiment, the following arrangement is made. Namely, each of the second and the third shift control valves $6_2$, $6_3$ is provided with a second oil chamber 6d which urges the valve toward the oil supply position, and the above-described oil passage L15 is connected to the oil chamber 6d. In the closed position of the fail-safe valve 9, the line pressure from the oil passage L2, which serves as the oil supply passage, is inputted into the oil chamber 6d via the oil passage L15. Each of the shift control valves $6_2$, $6_3$ is thus forcibly switched to, and held in, the oil supply position. By employing this arrangement, when the fail-safe valve 9 is switched to the closed position at the time of failure, both the second and the third clutches C2, C3 are forcibly supplied with hydraulic oil to thereby surely establish the fifth-speed transmission train. As another embodiment, the following may also be employed. Namely, an oil passage to input the signal pressure of the solenoid valve and the oil passage L15 are connected to the oil chamber 6a of each of the shift control valves $6_2$, $6_3$ via a shuttle valve. At the time of failure, the line pressure from the oil passage L2 is inputted into the oil chamber 6a via the oil passage L15 and the shuttle valve. Each of the shift control valves $6_2$, $6_3$ is thus switched to, and maintained in, the oil supply position.

In addition, when the electric power supply to all of the solenoid valves $7_1$ through $7_5$ is stopped because of failure in the system due, for example, to breaks in cables or the like, only the signal pressures of both the second and the third solenoid valves $7_2$, $7_3$, which are of normally-open type, become high. As a result, the hydraulic oil is supplied to the second and the third clutches C2, C3 via both the second and the third shift control valves $6_2$, $6_3$, whereby the fifth-speed transmission train is established. However, it is difficult only with the fifth-speed transmission train to start to move the vehicle or to drive it at a low speed. Therefore, at the time of failure in the system, it is desirable to establish the fifth-speed transmission train in the D position and to establish a transmission train which is lower than the fifth-speed, e.g., the third-speed transmission train, in the M position so that the vehicle speed can be switched between the fifth speed and the third speed by switching the range between the D position and the M position. In order to meet this requirement, it becomes necessary to engage the first clutch C1 instead of the second clutch C2 in the M position.

Therefore, in the present embodiment the following arrangement is employed. Namely, there is provided a changeover valve 15 which selectively connects an oil passage L11 which is communicated with the second solenoid valve $7_2$ to the oil chamber 6a of the second shift control valve $6_2$ and to the oil chamber 6a of the first shift control valve $6_1$. At the time of failure in the system, the oil passage L11 is connected, in the D position, to the oil chamber 6a of the second shift control valve $6_2$. The second shift control valve $6_2$ is thus switched to the oil supply position by the high-pressure signal pressure from the second solenoid valve $7_2$ to thereby engage the second clutch C2. In the M position, the oil passage L11 is connected to the oil chamber 6a of the first shift control valve $6_1$. The first shift control valve $6_1$ is thus switched to the oil supply position to thereby engage the first clutch C1.

The changeover valve 15 is switchable between the following two changeover positions, i.e.: a first switchover position on the right side (illustrated position) in which an oil passage L10 which is communicated with the first solenoid valve $7_1$ and the oil passage L11 which is communicated with the second solenoid valve $7_2$ are connected to the oil chamber 6a of the first shift control valve $6_1$ and the oil chamber 6a of the second shift control valve $6_2$, respectively; and a second changeover position on the left side in which these connections are shut off and the oil passage L11 is connected to the oil chamber 6a of the first shift control valve $6_1$. The changeover valve 15 is urged toward the first changeover position by a spring 15a. Further, the changeover valve 15 is provided with an oil chamber 15b on the left end for urging the changeover valve 15 toward the first changeover position and an oil chamber 15c on the right end for urging the changeover valve 15 toward the second changeover position. The oil chamber 15b has connected thereto an oil passage L16 which is connected, in the D position of the manual valve 5, to the oil passage L1 and which is open to the atmosphere in the M position thereof. The oil chamber 15c receives, as an input, the signal pressure from the second solenoid valve $7_2$ via an oil passage L17 which is branched from the oil passage L11. In this arrangement, in the D position, the line pressure from the oil passage L1 is inputted into the oil chamber 15b. Even if the signal pressure from the second solenoid valve $7_2$ becomes the highest (modulator pressure) due to the failure in the system, the changeover valve 15 is maintained in the first changeover position. In the M position, on the other hand, the oil chamber 15b is opened to the atmosphere via the oil passage L16. Therefore, if the signal pressure from the second solenoid valve $7_2$ becomes the highest due to the failure in the system, the changeover valve 15 is switched to the second changeover position. The first shift control valve $6_1$ is thus switched to the oil supply position as described above and the first clutch C1 is engaged, whereby the third-speed transmission train is established.

While the vehicle is running at a high speed in a high-speed transmission train above the fourth-speed transmission train in the M position, if the vehicle is shifted down to the third-speed transmission train due to the failure in the system, there is a possibility that the engine may give rise to an overrotation. As a solution, in the present embodiment, the oil passage L17 has interposed therein a gate valve (open-close valve) 16 which is switchable between an open position (illustrated position) on the right side in which the oil passage L17 is opened and a closed position on the left side in which the oil passage L17 is shut off. The gate valve 16 is urged by a spring 16a toward the open position. Also, the oil passage L7 to be communicated with the first brake B1 which is engaged at the time of establishing a transmission train which is lower than the third-speed transmission train, e.g., the second-speed transmission train, is connected to the oil chamber 16b on the right end of the gate valve 16. It is thus so arranged that the gate valve 16 can be switched to the closed position by the hydraulic pressure of the first brake B1 against the spring 16a at the time of establishing the second-speed transmission train. In addition, the gate valve 16 has formed therein an annular groove 16c which is communicated with the oil passage L2 in the closed position. The diameter of a land on the left side of the annular groove 16c is made larger than that of a land on the right side of the same. When the gate valve 16 is once switched to the closed position, there will be operated a leftward urging force equivalent to the difference in the land diameters, by the line pressure to be inputted from the oil passage L2 into the annular groove 16c. As a result of this urging force, the gate valve 16 is maintained in the closed position irrespective of the hydraulic pressure of the first brake B1.

According to the above-described arrangement, as soon as the second-speed transmission train has been established after the vehicle starts in the D position and in the M position, the gate valve 16 is switched to the closed position. Thereafter, as long as the manual valve 5 is in the D position and in the M position, the gate valve 16 is maintained in the closed position, and the signal pressure from the second solenoid valve $7_2$ ceases to be inputted into the oil chamber 15c of the changeover valve 15. Therefore, even if the system fails in the M position, the changeover valve 15 is not switched to the second changeover position but the fifth-speed transmission train is established at the time of failure in the system. As a consequence, there is no possibility that the transmission is shifted down to the third-speed transmission train due to the failure in the system while running at a high speed. In addition, even if the gate valve 16 is maintained in the closed position, if the manual valve 5 is switched to the N position, the oil passage L2 is opened to the atmosphere. The gate valve 16 will thus be returned to the open position by the urging force of the spring 16a. In this manner, at the time of failure in the system, if the manual valve 5 is once switched to the N position and then switched to the M position, the changeover valve 15 is switched to the second changeover position. The third-speed transmission train can thus be established as explained hereinabove. The speed shifting to the fifth speed and the third speed can be made by an operation of switching the range to the D position and to the M position.

In this embodiment, an arrangement has been made that the gate valve 16 is switched to the closed position when the second-speed transmission train is established. An arrangement may also be made that the hydraulic pressure of the second brake B2 is inputted into the oil chamber 16b of the gate valve 16 so that, when the first-speed transmission train is established, the gate valve is switched to the closed position.

In addition, in the present embodiment, an arrangement has been made that each of the shift control valves $6_1$ through $6_5$ is controlled by the electronic control circuit 11 via each of the solenoid valves $7_1$ through $7_5$. However, an arrangement may also be made that each of the shift control valves $6_1$ through $6_5$ is constituted by a solenoid valve so that each of the shift control valves $6_1$ through $6_5$ can be directly controlled by the electronic control circuit 11.

An explanation has so far been made about an embodiment in which the present invention is applied to the planetary gear type of automatic transmission. However, the present invention can also be applied to a control apparatus of a parallel-two-shaft type of automatic transmission.

As is clear from the above explanations, according to the present invention, even if control malfunction in the first group of shift control valves occurs at the time of failure in the system, the hydraulic oil can be supplied to the corresponding hydraulic engaging elements, whereby a predetermined-speed transmission train can be surely established. The redundancy of the fail-safe can be improved.

It is readily apparent that the above-described control apparatus for a vehicular automatic transmission meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. A control apparatus for a vehicular automatic transmission having a plurality of hydraulic engaging elements for establishing a plurality of speed transmission trains by supply of hydraulic oil to, and discharge thereof from, the plurality of hydraulic engaging elements, said control apparatus comprising:

a plurality of shift control valves corresponding to the plurality of hydraulic engaging elements for independently controlling the supply of hydraulic oil to, and the discharge thereof from, each of the hydraulic engaging elements;

the plurality of shift control valves being divided into a first group of shift control valves corresponding to the hydraulic engaging elements for establishing a predetermined-speed transmission train and a second group of shift control valves corresponding to the other hydraulic engaging elements;

a fail-safe valve interposed between an oil supply passage which is connected to a hydraulic pressure source and the second group of shift control valves so as to be switchable between an open position in which the oil supply passage is connected to the second group of shift control valves and a closed position in which this connection is shut off;

the fail-safe valve being switched to the closed position in a condition in which the hydraulic oil is supplied to all of such plurality of hydraulic engaging elements as are not to be engaged at the same time, whereby the oil supply passage is connected only to the first group of shift control valves;

wherein each of the first group of shift control valves is provided with an oil chamber for urging each of the shift control valves toward an oil supply position in which the hydraulic oil is supplied to corresponding hydraulic engaging elements; and wherein each of the oil chambers is connected to the oil supply passage via the fail-safe valve in the closed position of the fail-safe valve, whereby the first group of shift control valves are switched to, and maintained in, the oil supply position.

* * * * *